(12) United States Patent
Nakayama (10) Patent No.: US 12,025,503 B2
(45) Date of Patent: Jul. 2, 2024

(54) TEMPERATURE SENSOR AND COOKING DEVICE

(71) Applicant: SHIBAURA ELECTRONICS CO., LTD., Saitama (JP)

(72) Inventor: Noriyuki Nakayama, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 566 days.

(21) Appl. No.: 17/292,988

(22) PCT Filed: Dec. 11, 2018

(86) PCT No.: PCT/JP2018/045408
§ 371 (c)(1),
(2) Date: May 11, 2021

(87) PCT Pub. No.: WO2020/121392
PCT Pub. Date: Jun. 18, 2020

(65) Prior Publication Data
US 2022/0003610 A1    Jan. 6, 2022

(51) Int. Cl.
*G01K 1/14*    (2021.01)
*A47J 27/00*    (2006.01)
*F24C 3/12*    (2006.01)

(52) U.S. Cl.
CPC ............. *G01K 1/14* (2013.01); *A47J 27/004* (2013.01); *F24C 3/126* (2013.01)

(58) Field of Classification Search
CPC ........... G01K 1/14; A47J 27/004; F24C 3/126
See application file for complete search history.

(56) References Cited

U.S. PATENT DOCUMENTS

| | | | | |
|---|---|---|---|---|
| 4,234,783 A | * | 11/1980 | Aoshima | A47J 27/004 99/332 |
| 4,751,368 A | * | 6/1988 | Daifotes | A47J 36/2483 219/447.1 |
| 2008/0314258 A1 | * | 12/2008 | Martin | A47J 29/02 99/329 R |

FOREIGN PATENT DOCUMENTS

| | | |
|---|---|---|
| JP | 2010162106 A | 7/2010 |
| JP | 2012215697 A | 11/2012 |
| JP | 2015094523 A | 5/2015 |

(Continued)

OTHER PUBLICATIONS

Extended European Search Report issued in corresponding European Patent Application No. EP 18942796.6 dated Nov. 5, 2021 (86 pages).

(Continued)

*Primary Examiner* — Randy W Gibson
(74) *Attorney, Agent, or Firm* — Osha Bergman Watanabe & Burton LLP (57) ABSTRACT

A sensor detects presence and temperature of a measurement object. The sensor includes: a temperature sensor that detects the temperature of the measurement object; a sensor holder that holds the temperature sensor in a movable manner; and a detector that detects the presence of the measurement object in response to a movement of the temperature sensor. The detector includes a shield that moves in response to the movement of the temperature sensor, the sensor holder includes a pipe that holds the shield and controls a movement of the shield such that the shield moves in a predetermined direction in response to the movement of the temperature sensor, and the shield and the pipe are different in hardness.

16 Claims, 9 Drawing Sheets

(56) References Cited

FOREIGN PATENT DOCUMENTS

| JP | 2016003361 A | 1/2016 |
| JP | 2016101237 A | 6/2016 |
| JP | 2017072301 A | 4/2017 |
| JP | 2018048760 A | 3/2018 |
| JP | 2018071407 A | 5/2018 |
| JP | 2019203671 A | 11/2019 |

OTHER PUBLICATIONS

Office Action issued in corresponding Japanese Patent Application No. 2020-549082, mailed Jan. 5, 2021, with translation (9 pages).
International Search Report issued in corresponding International Application No. PCT/JP2018/045408, mailed Mar. 19, 2019, with translation (4 pages).

* cited by examiner

TEMPERATURE SENSOR AND COOKING DEVICE

TECHNICAL FIELD

The present invention relates to a temperature sensor including a movable body for maintaining the contact state with a temperature measurement object, and relates to, as an example, a temperature sensor to contact with a bottom surface of a cookware that is heated, and measure the temperature of the cookware.

BACKGROUND

In a recent cooking device such as a gas stove and an electrical rice cooker, for example, a temperature sensor is provided. The temperature sensor is brought into contact with a bottom surface of a cookware such as a saucepan and a frying pan, for example, to measure the temperature of the cookware, and is provided with a heat collecting body to contact with the bottom surface of the cookware so as to be capable of reciprocating in the up-down direction. Elastic force is applied to the heat collecting body upward by a coil spring. As a heat-sensitive element, for example, a thermistor element is provided in contact with or close to the heat collecting body, and measures the temperature of the cookware by receiving the heat transferred from the heat collecting body. Note that the thermistor element herein includes a thermistor as a heat-sensitive body and lead wires electrically connected with the thermistor.

For example, in the case of the gas stove, the temperature sensor is provided at a central region of a trivet, and when the cookware is placed on the trivet, the cookware comes into contact with the heat collecting body, so that the heat collecting body is pressed down. Since the elastic force is applied to the heat collecting body upward, the contact state with the cookware is maintained by the elastic force during cooking. When the cookware is lifted from the trivet after the finish of the cooking, the heat collecting body is pressed up by the elastic force, to the initial position. In this way, this kind of temperature sensor includes the heat collecting body as a movable body to reciprocate.

As disclosed in Patent Literature 1 and Patent Literature 2, for example, the temperature sensor has a physical body detection function to detect whether the temperature sensor contacts with the bottom surface of the cookware such as a saucepan and a cooker.

The detection of the cookware is performed by detecting a magnetic field that is generated from a permanent magnet. There is a plurality of specific techniques.

For example, a magnetic shield to reciprocate between the permanent magnet and a reed switch is provided. When a magnetic body gets out of between the permanent magnet and the reed switch, the reed switch receives the magnetic field, and thereby detects the presence of the cookware. The magnetic body is provided so as to reciprocate in accordance with the reciprocation of the heat collecting body (movable body).

Alternatively, a magnetic body to reciprocate between the permanent magnet and the vicinity of a magnetic sensor is provided. When the magnetic body is in a predetermined range, the magnetic sensor receives the magnetic field of the permanent magnet through the magnetic body, and thereby detects the cookware. The magnetic body is also provided so as to reciprocate in accordance with the reciprocation of the heat collecting body.

PATENT LITERATURE

Patent Literature 1: JP 2016-101237 A
Patent Literature 2: JP 2018-48760 A

The temperature sensor having the physical object detection function described above needs to ensure the physical object detection function for a long period. Particularly, for exerting the function, the magnetic body needs to reciprocate, and the reciprocation causes the friction due to the slide with a member in the periphery. Hence, one or more embodiments of the present invention provide a temperature sensor that makes it possible to reduce the friction force caused by the reciprocation.

SUMMARY

A temperature sensor (sensor) configured to detect presence and temperature of a measurement object according to one or more embodiments of the present invention includes: a sensor unit (temperature sensor) configured to detect the temperature of the measurement object; a holding unit (sensor holder) configured to hold the sensor unit in a movable manner; and a detection unit (detector) configured to detect the presence of the measurement object in response to the movement of the sensor unit.

The detection unit of one or more embodiments includes a first member (shield or magnetic shield) configured to move in response to the movement of the sensor unit. The holding unit of one or more embodiments includes a second member (pipe or protective pipe) configured to restrict the movement of the first member and hold the first member such that the first member moves in a predetermined direction in response to the movement of the sensor unit.

In the temperature sensor of one or more embodiments, the first member and the second member are different in hardness.

In one or more embodiments, the temperature sensor has the following configuration.

The sensor unit includes a heat-sensitive body, and a pair of electrical wires connected with the heat-sensitive body.

The holding unit includes a protective pipe comprising a non-magnetic body and containing the electrical wires in an interior, a position of the protective pipe being fixed by an object device, and a movable body configured to support the heat-sensitive body and attached so as to be capable of moving relative to the protective pipe.

The detection unit includes a magnetic shield attached to the electrical wires and configured to be capable of moving in an interior of the protective pipe, a magnetic sensor provided at a fixed position outside the protective pipe and configured to detect a change in a magnetic field due to the movement of the magnetic shield that is linked with the movement of the movable body, and a magnetic field generation body provided at a fixed position outside the protective pipe and configured to generate the magnetic field.

In the temperature sensor, the magnetic shield as the first member and the protective pipe as the second member are different in hardness.

The magnetic shield of one or more embodiments can move between a shield position and a non-shield position, the shield position being a position where the action of the magnetic field from the magnetic field generation body on the magnetic sensor is shielded, the non-shield position being a position where the action of the magnetic field from the magnetic field generation body on the magnetic sensor is allowed.

In one or more embodiments, the magnetic shield includes a shield part (shield cover) surrounding a periphery of the electrical wires such that there is play, a holder (wire holder) holding the electrical wires, and a connection piece (connector) connecting the shield part and the holder. In the temperature sensor of one or more embodiments, the holder is disposed on an opposite side of the heat-sensitive body with respect to the shield part.

In the magnetic sensor of one or more embodiments, the holder moves between a first position and a second position, the first position being a forward end of a movable range on a side on which the heat-sensitive body is provided, the second position being a rearward end of the movable range on an opposite side of the first position. In one or more embodiments, at the second position, the holder is farther from between the magnetic field generation body and the magnetic sensor, than at the first position.

In one or more embodiments, the magnetic shield is composed of a martensitic stainless steel or a ferritic stainless steel, the protective pipe is composed of an austenitic stainless steel, and the magnetic shield is harder than the protective pipe.

In one or more embodiments, a difference in hardness between the magnetic shield and the protective pipe is 50 Hv or more.

One or more embodiments provide a cooking device including a temperature sensor (sensor) configured to detect presence and temperature of a measurement object.

The temperature sensor of one or more embodiments includes: a sensor unit (temperature sensor) configured to detect the temperature of the measurement object; a holding unit configured to hold the sensor unit in a movable manner; and a detection unit configured to detect the presence of the measurement object in response to the movement of the sensor unit.

In one or more embodiments, the detection unit includes a first member configured to move in response to the movement of the sensor unit, and the holding unit includes a second member configured to restrict the movement of the first member and hold the first member such that the first member moves in a predetermined direction in response to the movement of the sensor unit. Further, the first member and the second member are different in hardness.

In the temperature sensor according to one or more embodiments of the present invention, there is a difference in hardness between the first member and the second member, and therefore, when the first member and the second member slide, the member having a lower hardness preferentially abrades, so that it is possible to reduce the friction force.

DETAILED DESCRIPTION OF EMBODIMENTS

Hereinafter, embodiments of the present invention will be described.

In a temperature sensor (sensor) 1 according to one or more embodiments, a magnetic shield 61 to reciprocate in the interior of a protective pipe 51 is produced so as to be lower in hardness than the protective pipe 51. Thereby, the magnetic shield 61 abrades more easily than the protective pipe 51, and thereby, it is possible to reduce the friction force.

[Overall Configuration]

One or more embodiments of the present invention will be described with reference to the drawings. Note that, in the following description, the upper side in each figure is regarded as an upward side U, and the lower side is regarded as a downward side L.

Figure 8:
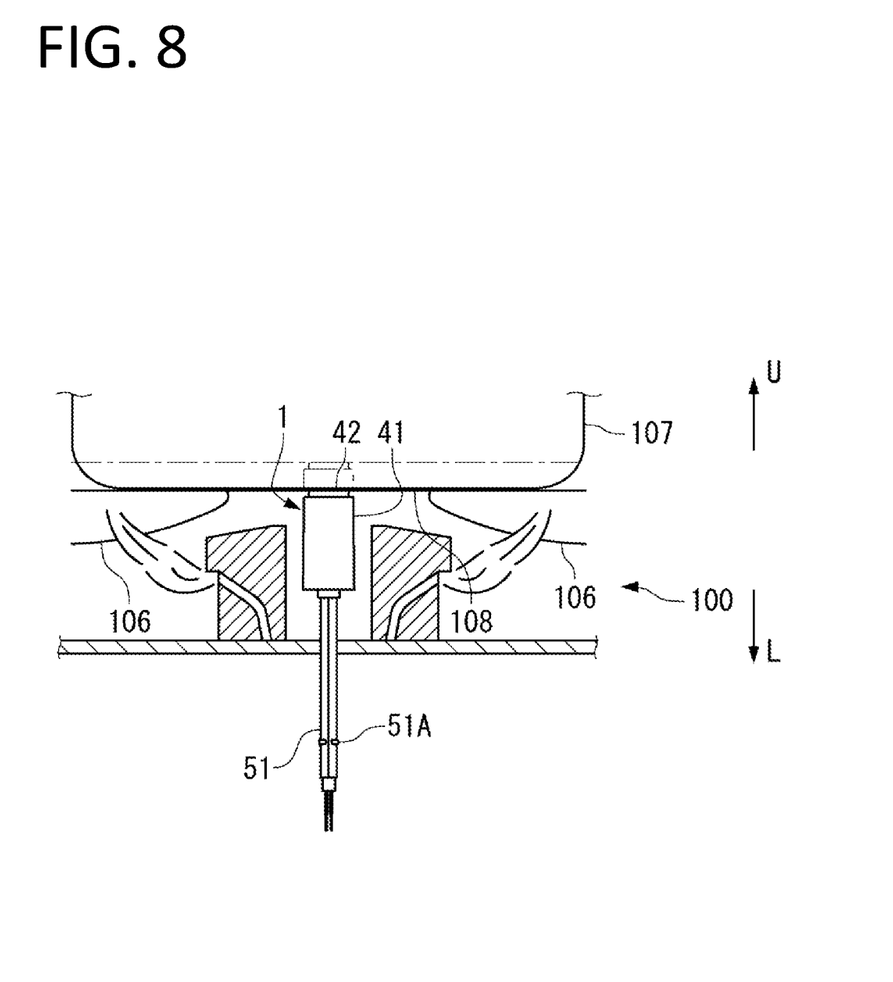
FIG. 8 is a diagram showing a principal part of a gas stove including the temperature sensor according to one or more embodiments.

As shown in FIG. 8, as an example, in a gas stove 100 as a cooking device, the temperature sensor 1 contacts with a bottom surface 108 of a cookware 107 such as a saucepan and detects the temperature. The temperature sensor 1 is provided at a center between trivets 106, 106 on which the cookware 107 is placed, or at a position close thereto.

Figure 1A:
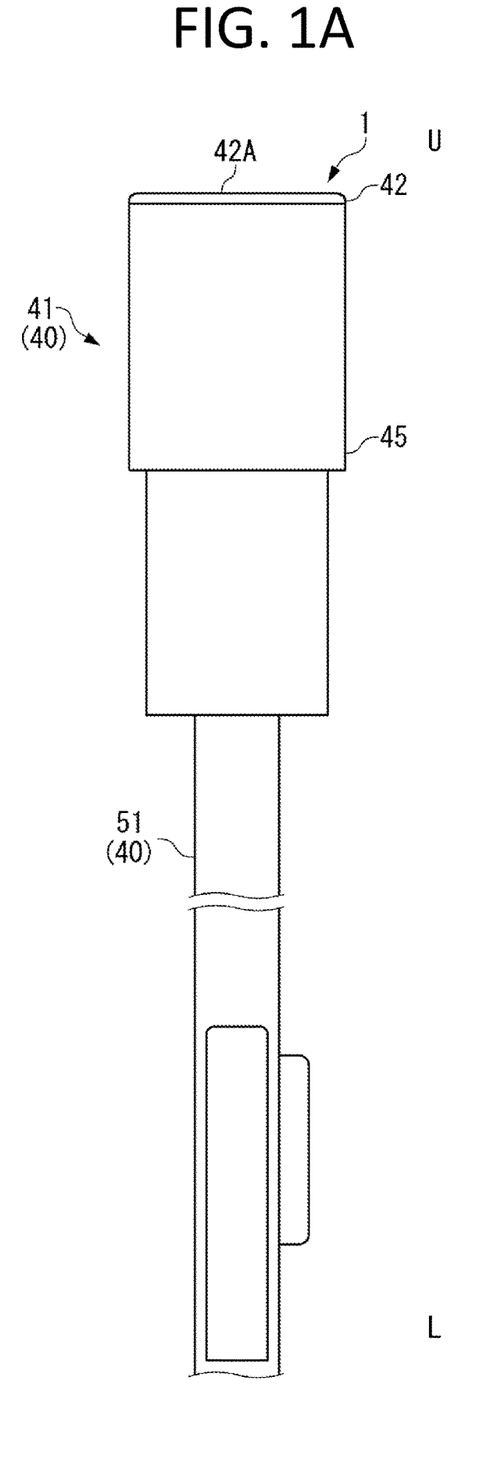
FIG. 1A and FIG. 1B each show a temperature sensor according to one or more embodiments of the present invention, FIG. 1A being a lateral view, FIG. 1B being a longitudinal sectional view.
Figure 1B:
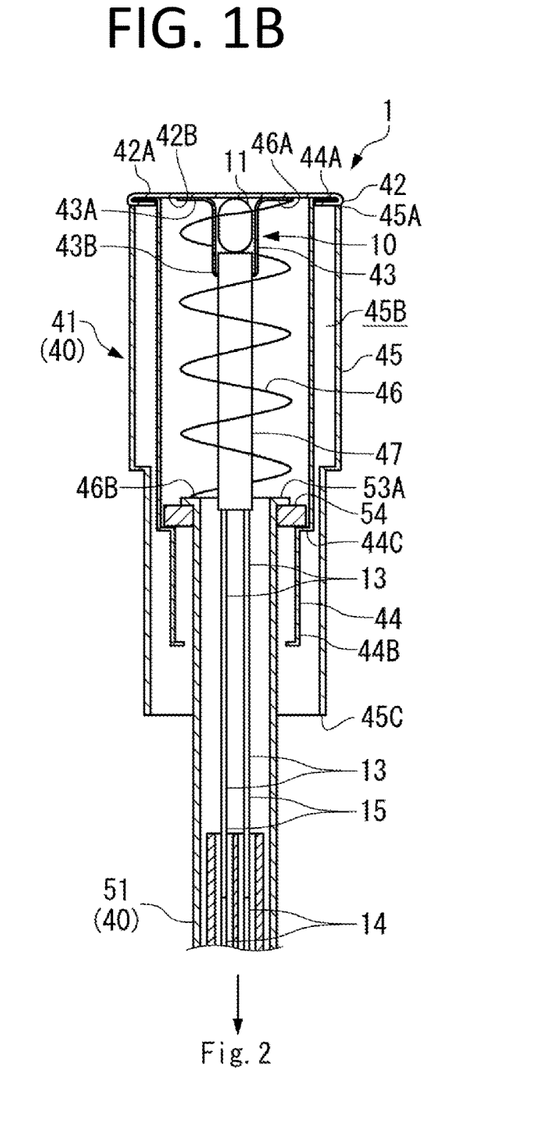
Figure 2:
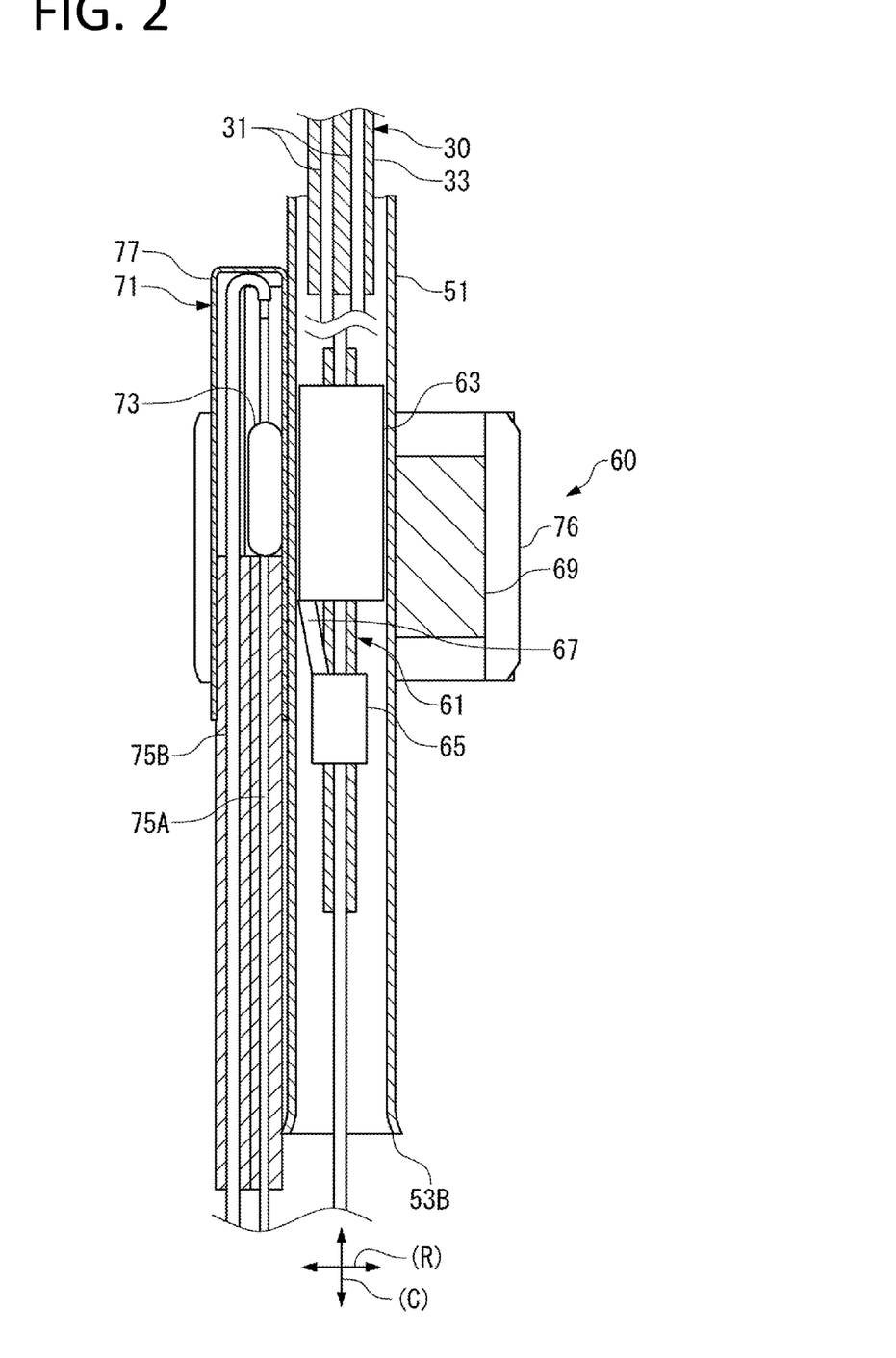
FIG. 2 is a longitudinal sectional view showing a detection unit of the temperature sensor according to one or more embodiments.

As shown in FIG. 1A, FIG. 1B and FIG. 2, the temperature sensor 1 includes a heat-sensitive element (temperature sensor) 10 that is a main element for temperature detection, connecting wires 30 that are electrically connected with lead wires 13 of the heat-sensitive element 10, and a sensor holding body (sensor holder) 40 that holds the heat-sensitive element 10. Further, as shown in FIG. 8, the temperature sensor 1 is attached to the gas stove 100 through the protective pipe 51, such that a contact surface of a heat collecting body 42 described later protrudes from end parts on the upward side U of the trivets 106, 106, to the upward side U.

[Heat-Sensitive Element 10]

Figure 3:
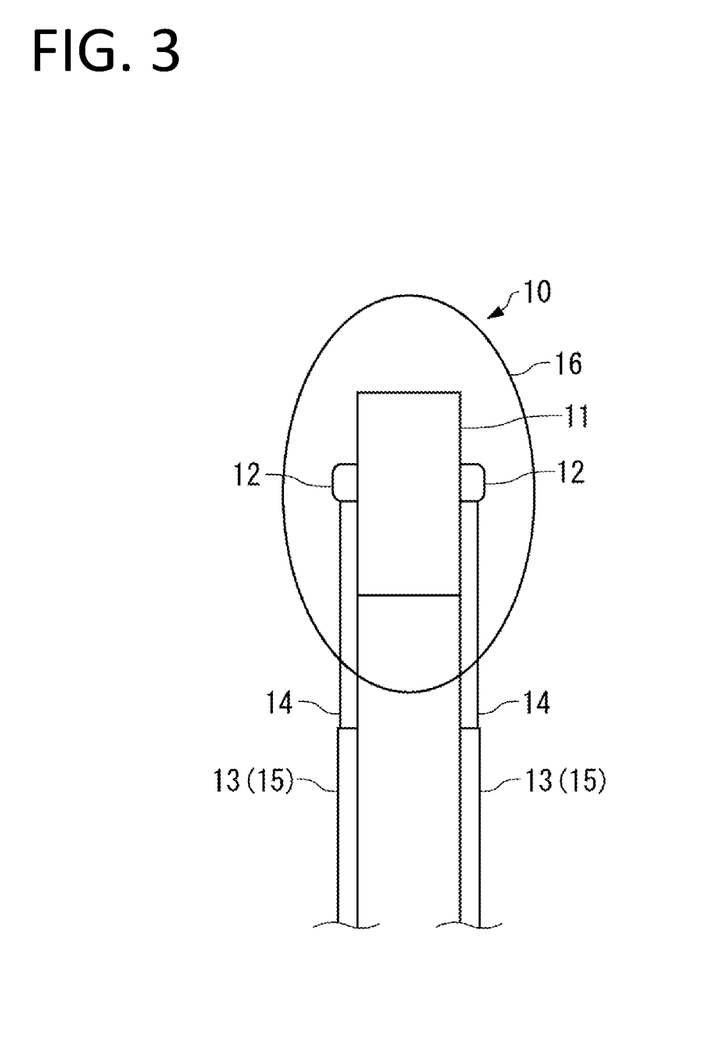
FIG. 3 is a diagram showing a heat-sensitive element of the temperature sensor according to one or more embodiments.

As shown in FIG. 3, the heat-sensitive element 10 includes a heat-sensitive body 11, electrodes 12, 12 that are formed on two facing surfaces (right and left in the figure) of the heat-sensitive body 11 respectively, a pair of lead wires 13, 13 that is electrically connected with the heat-sensitive body 11 through the electrodes 12, 12, and a protective layer 16 that seals the heat-sensitive body 11.

For the heat-sensitive body 11, a metal oxide or metal having the property that the electrical resistance value changes with temperature change is used. A constant electrical current flows through the heat-sensitive body 11 via the pair of lead wires 13, 13, the voltage between the electrodes 12, 12 of the heat-sensitive body 11 is measured by a measuring device, the resistance value is evaluated from Ohm's law (E=IR), and the temperature is detected.

As the metal oxide, a thermistor (Thermally Sensitive Resistor) is suitably used, and typically, an NTC thermistor (Negative Temperature Coefficient Thermistor) having a negative temperature coefficient is used. As the metal, a platinum (for example, Pt100; JIS-C1604) is suitably used.

The electrode 12 electrically connects the heat-sensitive body 11 and the lead wire 13, and is composed of a noble metal such as gold and platinum in one or more embodiments.

The lead wire 13 is a conducting wire via which the constant electrical current flows through the heat-sensitive body 11, and includes a core wire 14 and an insulating covering 15 covering the core wire 14. For the core wire 14, a metal material having a high electrical conductivity, typically, copper is used. The core wire 14 of the lead wire 13 is formed of a solid wire.

In the case where glass is used as the protective layer 16, a Dumet wire is suitably used for the core wire 14. The Dumet wire is a composite wire in which an inner layer composed of an iron-nickel alloy is clad in an outer layer composed of copper. The linear expansion coefficient of the iron-nickel alloy composing the inner layer is close to that of glass. Accordingly, even in the case where the protective layer 16 is composed of glass, the breakage of the protective layer 16 due to the thermal expansion of the core wire 14 is inhibited by the use of the Dumet wire.

The insulating covering 15 is an insulating body that covers the outer circumference surface of the core wire 14.

The lead wire 13 has the same role as the connecting wire 30 described later, as an electrical wire via which the constant electrical current flows through the heat-sensitive body 11. An electrical wire directly connected with the heat-sensitive body 11 is referred to as the lead wire 13, and an electrical wire indirectly connected with the heat-sensitive body 11 through the lead wire 13 is distinctively referred to as the connecting wire 30.

The protective layer 16 is provided for avoiding the occurrence of the chemical change and physical change in the heat-sensitive body 11 by sealing the heat-sensitive body 11 and maintaining the airtight state. As the protective layer 16, glass is used in one or more embodiments, but a resin material can be used depending on the environment in which the temperature sensor 1 is used.

[Connecting Wire 30]

The connecting wire 30 shown in FIG. 2 is an electrical wire for electrically connecting the heat-sensitive element 10 and an unillustrated electrical circuit and the like at the rear, and includes a core wire 31 and an insulating covering 33 covering the core wire 31.

The core wire 31 is a twisted wire made by twisting a plurality of conducting wires, for example, 7 or 12 conducting wires. As each conducting wire constituting the twisted wire, a conducting wire having a smaller wire diameter than the core wire 14 of the lead wire 13 is used.

The connecting wire 30 is inserted into the protective pipe 51, one end thereof is electrically connected with an end part of the lead wire 13, for example, by welding, and the other end is connected with the unillustrated electrical circuit and the like at the rear. As the connecting wire 30, an electrical wire having a sufficiently smaller wire diameter than the protective pipe 51 and having such a strength that the electrical wire does not deform even when pressing force is applied from the cookware 107 through a contact surface 42A of a movable body 41 is used. Further, the connecting wire 30 is disposed on the inside of the protective pipe 51, such that when the movable body 41 moves, the connecting wire 30 is capable of moving in the axial direction of the protective pipe 51 in response to the movement.

Figure 6A:
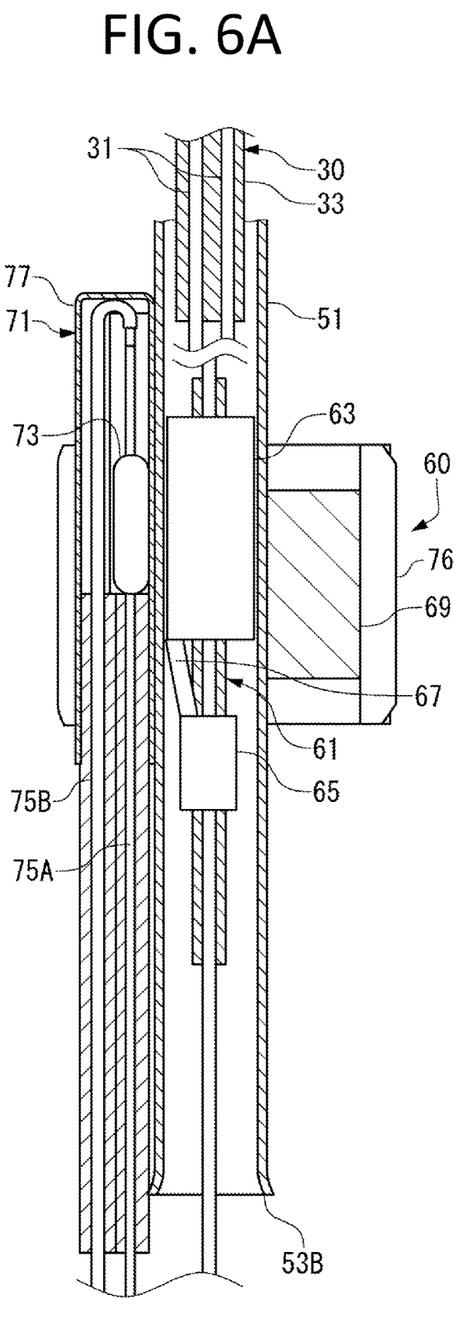
FIG. 6A and FIG. 6B are longitudinal sectional views showing a motion of the vicinity of joining portions between lead wires and connecting wires of the temperature sensor according to one or more embodiments, FIG. 6A showing a state (shield position) where no cookware has been placed and where a magnetic field from a permanent magnet is shielded, FIG. 6B showing a state (non-shield position) where the cookware has been placed and where the magnetic field from the permanent magnet is not shielded and reaches a reed switch.
Figure 6B:
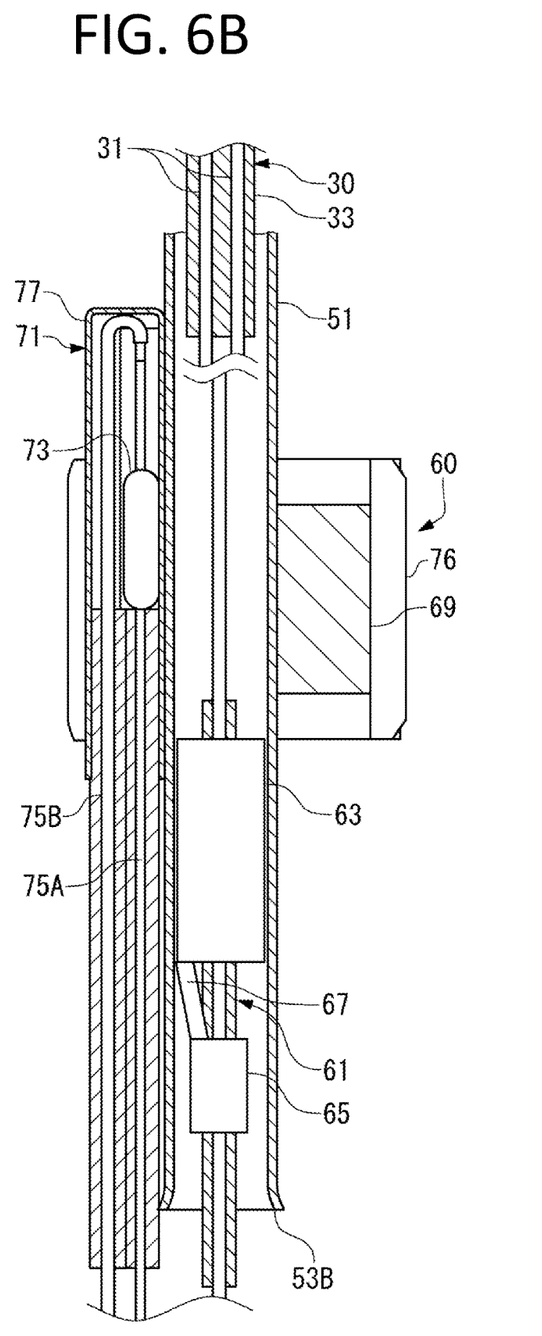

Note that, in FIG. 2, FIG. 6A and FIG. 6B, at cut portions, the connecting wire 30 is twisted by 90°.

[Sensor Holding Body 40]

As shown in FIG. 1A and FIG. 8, the sensor holding body 40 includes the movable body 41 provided so as to be capable of moving to the downward side L when abutting on the bottom surface 108 of the cookware 107, and the protective pipe 51 supporting the movable body 41.

[Movable Body 41]

As shown in FIG. 1A, FIG. 1B and FIG. 8, the movable body 41 includes a plate-shaped heat collecting body 42 whose front surface abuts on the bottom surface 108 of the cookware 107, a containing pipe 43 provided on the back surface side of the heat collecting body 42 and containing and holding the heat-sensitive body 11, a pipe-like holder 44 supporting the heat collecting body 42 at an upper end part 44A, a pipe-like cover 45 covering the holder 44 from the upper end part 44A to around a lower end part 44B concentrically, and a coil spring 46. In one or more embodiments, the heat collecting body 42, the containing pipe 43, the holder 44, the cover 45 and the coil spring 46 are composed of a metal material having heat resistance and oxidation resistance, for example, stainless steel.

The heat collecting body 42 has the flat contact surface 42A on the front surface, such that the contact surface 42A planarly contacts with the bottom surface 108 of the cookware 107.

The containing pipe 43 has an upper end part 43A formed in a flange shape. The upper end part 43A is joined to a back surface 42B of the heat collecting body 42, for example, by welding. Thereby, in the containing pipe 43, the upper end part 43A side is closed. A lower end part 43B of the containing pipe 43 is opened. In the interior of the containing pipe 43, the heat-sensitive body 11 of the heat-sensitive element 10 is contained. The heat-sensitive body 11 is contained in the containing pipe 43, such that the upper end part of the heat-sensitive body 11 contacts with the back surface 42B of the heat collecting body 42. In one or more embodiments, the interior of the containing pipe 43 is filled with a filler for bridging the clearance between the containing pipe 43 and the heat-sensitive body 11. In one or more embodiments, the filler contains a heat-resistant adhesive agent, particularly, a metal filler.

The holder 44 is a pipe-like member having a larger diameter than the containing pipe 43, and comprising the upper end part 44A and lower end part 44B that have different diameters. In the interior of the upper end part 44A, the containing pipe 43, the heat-sensitive element 10 and an insulating tube 47 are contained.

The upper end part 44A of the holder 44 is formed in a flange shape, and a circumference part of the heat collecting body 42 is folded over the whole circumference of the upper end part 44A of the holder 44. Thereby, in the holder 44, the side of the upper end part 44A is hermetically sealed by the heat collecting body 42, and therefore, even in the case of boiling over the cookware, the boiled soup does not come in the interior.

On the downward side L of the upper end part 44A of the holder 44, the lower end part 44B having smaller diameter than the upper end part 44A is formed via a step part 44C. An opening part 44E is formed on the downward side L of the lower end part 44B, and from the opening part 44E, the protective pipe 51 protrudes to the exterior of the holder 44. Further, the step part 44C *comes* into contact with a metal washer 54 formed on the inside of the protective pipe 51 described later, and thereby the position of the movable body 41 is determined. The position of the movable body 41 at this time is a position when the movable body 41 has maximally moved to the upward side U relative to the protective pipe 51. The movable body 41 is at this position when the load is not applied to the heat collecting body 42, that is, when the cookware 107 has not been placed on the trivets 106, 106. Hereinafter, the position of the heat collecting body 42 when the load is not applied to the heat collecting body 42 (no load) is referred to as a first position.

An upper end part 45A of the cover 45 is closed, and the inside forms a cylindrical void 45B. Further, a lower end part 45C of the cover 45 is opened.

The upper end part 45A of the cover 45 is pressed into the outer circumference of the upper end part 44A of the holder 44, and thereby, the cover 45 is fixed to the holder 44. Thus, the holder 44 and the cover 45 are fixed in a mutually liquid-tight state.

The coil spring 46 is an elastic body for biasing the heat collecting body 42, the holder 44 and the cover 45 to the upward side U relative to the protective pipe 51. The coil spring 46 is contained in the interior of the holder 44, an upper end part 46A is supported on the side of the back surface 42B of the heat collecting body 42, and a lower end part 46B is supported at an upper end part of the protective pipe 51.

As shown in FIG. 8, the contact surface 42A of the heat collecting body 42 protrudes from upper ends of the trivets 106, 106, to the upward side U. Accordingly, when the cookware 107 is placed on the trivets 106, 106 of the gas stove 100, the contact surface 42A of the heat collecting body 42 comes into contact with the bottom surface 108 of the cookware 107, and the heat collecting body 42 is pressed down to the downward side L by the self-weight of the cookware 107. When the cookware 107 is placed on the trivets 106, 106, the contact surface 42A of the heat collecting body 42 is pressed down to a position shown by a solid line on the downward side L in FIG. 8. Accordingly, as the coil spring 46, a coil spring having such an elastic force that the contact of the heat collecting body 42 with the bottom surface 108 of the cookware 107 can be maintained when the cookware 107 is placed on the trivets 106, 106 is used. Hereinafter, the position of the heat collecting body 42 after the cookware 107 is placed on the gas stove 100 is referred to as a second position. In FIG. 8, only a top part of the heat collecting body 42 at the first position is shown by a chain line, and the whole of the heat collecting body 42 at the second position is shown by a solid line.

The insulating tube 47 is a tube that has insulating property and that protects the pair of lead wires 13, 13. The pair of lead wires 13, 13 of the heat-sensitive body 11 is inserted into the insulating tube 47, and end parts of the lead wires 13, 13 are electrically connected with the connecting wires 30 in the interior of the protective pipe 51 described later.

[Protective Pipe 51]

In the protective pipe 51, as shown in FIG. 1A and FIG. 1B, an upper end part 53A projecting to the upward side U in a flange shape is formed, and the metal washer 54 is disposed on a lower surface of the upper end part 53A. The metal washer 54 is a cylindrical member that is fit to the outer circumference of the protective pipe 51. The metal washer 54 restricts the movement amount of the holder 44 to the upward side L of the movable body 41. The metal washer is hit by the step part 44C of the holder 44, and thereby, the movement of the movable body 41 to the upward side U is restricted.

In one or more embodiments, the protective pipe 51 and the metal washer 54 are composed of the same metal material as that of the holder 44.

[Detection Unit 60]

As shown in FIG. 2, a detection unit (detector) 60 is provided on the side of a lower end 53B of the protective pipe 51. The detection unit 60 is provided for detecting that the cookware has been placed on the cooking device.

The detection unit 60 includes a magnetic shield 61 fixed to the connecting wires 30 disposed on the inside of the protective pipes 51, a magnetic field generation body 69 comprising a permanent magnet disposed on the outside of the protective pipe 51, and a reed switch 71 to operate by receiving the magnetic field from the magnetic field generation body 69.

<Magnetic Shield 61>

The magnetic shield 61 includes a shield part (shield cover) 63 for avoiding the magnetic field from the magnetic field generation body 69 from reaching the reed switch 71, a holder 65 for fixing the magnetic shield 61 to the connecting wires 30, and a connection piece (connector) 67 connecting the shield part 63 and the holder 65. As an example, the magnetic shield 61 is integrally formed by machining a metal plate constituted by a ferromagnetic body. As the material of the metal plate, a material having a magnetic property (magnetic permeability) that allows the absorption of all of the magnetic field (magnetic flux) from the magnetic field generation body 69 and further having a predetermined hardness relation with the material composing the protective pipe 51 is used. The hardness relation with the material composing the protective pipe 51 will be described later.

Figure 4A:
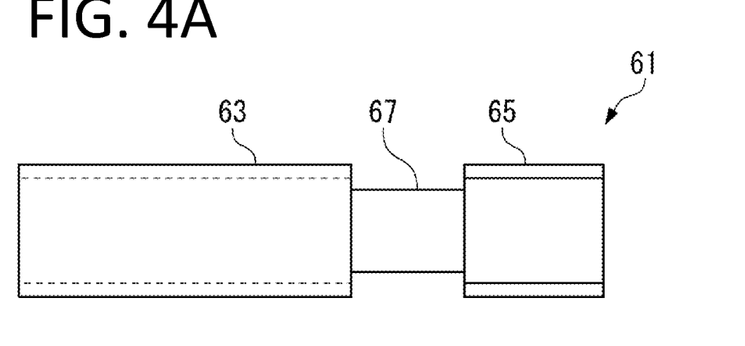
FIG. 4A, FIG. 4B and FIG. 4C each show only a magnetic shield of the temperature sensor according to one or more embodiments, FIG. 4A being a plan view, FIG. 4B being a lateral view, FIG. 4C being a front view.
Figure 4B:
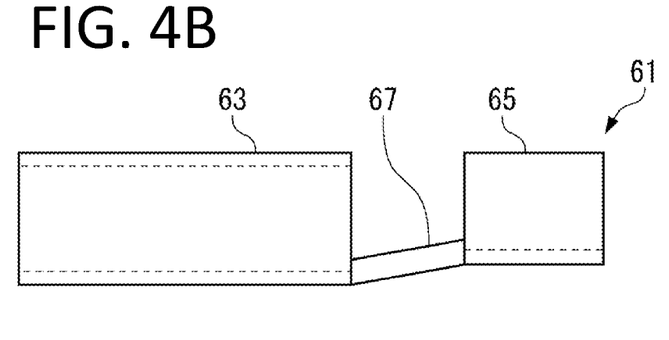
Figure 4C:
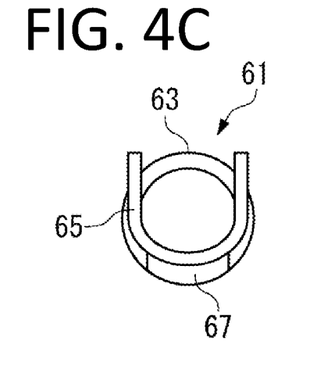

As shown in FIG. 2 and FIG. 4, the shield part 63 has a cylindrical shape having a predetermined size in an axis line direction (C). The connecting wires 30 are inserted into the inside of the shield part 63. The inner diameter of the shield part 63 is set such that the connecting wires 30 are surrounded while there is a predetermined play. The outer diameter of the shield part 63 is set to be smaller than the inner diameter of the protective pipe 51.

The size of the shield part 63 in the axis line direction (C) is set to a length that allows the absorption of all of the magnetic flux from the magnetic field generation body 69 when the shield part 63 is at a position facing the magnetic field generation body 69, and as an example, to nearly the same length as the length of a switch part 73 in the axis line direction (C). Note that the length of the shield part 63 is not limited to this, if the length of the shield part 63 is such a size that the magnetic field of the magnetic field generation body 69 is not avoided from reaching the switch part 73 when the cookware 107 is placed on the trivets 106, 106 and the shield part 63 is moved.

Further, here, a case where the shape of the shield part 63 is a cylindrical form is described as an example, but the present invention is not limited to this. This is because the shape of the shield part 63 does not need to be a cylindrical shape as long as the function of the magnetic shield can be exerted. For example, it is allowable to adopt a form in which only a side of the shield part 63 that faces the magnetic field generation body 69 is covered and a side that faces the reed switch 71 is opened, or a rectangular shape.

As shown in FIG. 4A, FIG. 4B and FIG. 4C, the holder 65 has a U-shape before the connecting wires 30 are swaged and is formed in a nearly cylindrical shape by swaging the connecting wires 30. By swaging the holder 65, the magnetic shield 61 is fixed to the connecting wires 30 and moves with the movement of the connecting wires 30.

The connection piece 67 is processed to be inclined toward the axis lines of the shield part 63 and the holder 65, such that the axis lines of the shield part 63 and the holder 65 coincide. Note that, in one or more embodiments, a case where the axis line of the shield part 63 and the axis line of the holder 65 coincide is exemplified, but the present invention is not limited to this. That is, an arbitrary inclination and shape can be employed if the holder 65 does not slide on an inner wall of the protective pipe 51 when the magnetic shield 61 moves.

The holder 65 is disposed on the opposite side of the heat-sensitive body with respect to the shield part 63.

The magnetic shield 61 reciprocates in the interior of the protective pipe 51 with the reciprocation of the connecting wires 30. As shown in FIG. 2, in the magnetic shield 61, the shield part 63 is magnetically pulled by the magnetic field generation body 69. Therefore, the magnetic shield 61 contacts with a side of the inner wall of the protective pipe 51 that faces the magnetic field generation body 69. Accordingly, the shield part 63 slides on the inner wall of the protective pipe 51 along with the reciprocation of the connecting wires 30, so that friction is generated.

<Magnetic Field Generation Body 69>

As shown in FIG. 2, the magnetic field generation body 69 is provided at a predetermined position outside one end of the protective pipe 51 in a radial direction (R). The magnetic field from the magnetic field generation body 69 acts on the reed switch 71.

The material of the magnetic field generation body 69 is arbitrary as long as the magnetic field generation body has such a magnetic force that the magnetic field reaches the reed switch 71. For example, in addition to a ferrite permanent magnet, a rare-earth magnet such as Sm—Co system rare-earth magnet and Nd—Fe—B system rare-earth magnet can be used. The magnetic field generation body 69 to be used in the cooking device is heated to about 150° C., and therefore, it is necessary to consider the Curie point. However, the Curies point of the ferrite permanent magnet (450° C.) or the rare-earth magnet such as Sm—Co system (750° C.) and Nd—Fe—B system (850° C.) is higher than 150° C.

Further, the magnetic field generation body 69 is not limited to a permanent magnet comprising a sintered body, and a bond magnet in which magnet powders are dispersed in a resin can be used.

Further, the magnetic field generation body 69 is not limited to the permanent magnet, and an electrical magnet can be used.

For example, the magnetic field generation body 69 is fixed to the protective pipe 51, in a state where the magnetic field generation body 69 is contained in a magnet holder 76 composed of a resin material. When the protective pipe 51 is composed of an austenite series stainless steel (JIS SUS304) that is a non-magnetic body as described above, the magnetic field from the magnetic field generation body 69 can pass through the protective pipe 51, can reach the interior, and depending on the position of the magnetic shield 61, can reach the reed switch 71.

<Reed Switch 71>

The reed switch 71 as a magnetic sensor is a switch for performing the ON/OFF switching of the unillustrated electrical circuit using the magnetic field from the exterior. As shown in FIG. 2, the reed switch 71 includes a switch part 73, lead wires 75A, 75B respectively connected with a pair of unillustrated ferromagnetic leads of the switch part 73, and a switch protective pipe 77 containing the switch part 73 and the lead wires 75A, 75B.

The switch part 73 is disposed at a predetermined position outside the protective pipe 51. In the switch part 73, the pair of ferromagnetic leads is encapsulated in a glass pipe, with a predetermined contact separation. When the pair of ferromagnetic leads receives the magnetic field from the magnetic field generation body 69 in the radial direction (the R direction in the figure) of the switch part 73, the pair of ferromagnetic leads is magnetized, and respective free ends come into contact with each other, so that a magnetic circuit is closed (ON). Further, when the magnetic field is eliminated, the contact is released by the elasticity of the respective leads, so that the magnetic circuit is opened (OFF).

The reed switch 71 is fixed to the protective pipe 51, in a state where the reed switch 71 is contained in the interior of the switch protective pipe 77. The switch part is fixed to the outside of the other end of the protective pipe 51 in the radial direction (R), and provided at a position on the opposite side of the magnetic field generation body 69 across the protective pipe 51.

The lead wires 75A, 75B are lines for electrically connecting the switch part 73 and the unillustrated electrical circuit. In one or more embodiments, whether the cookware 107 has been placed on the trivet 106 is detected based on the ON/OFF operation of the electrical circuit by the switch part 73. That is, at the time of the non-conduction (OFF) of the switch part 73, the electrical circuit detects that the cookware 107 has not been placed on the trivet, and at the time of the conduction (ON), the electrical circuit detects that the cookware 107 has been placed on the trivet 106.

[Motion of Temperature Sensor 1]

The motion and action of the temperature sensor 1 having the above configuration will be described with reference to FIG. 5A, FIG. 5B and FIG. 8.

When the cookware 107 is not placed on the trivet 106 of the gas stove 100 to which the temperature sensor 1 is attached, the movable body 41 is positioned at the first position shown by the chain line in FIG. 8.

Figure 5A:
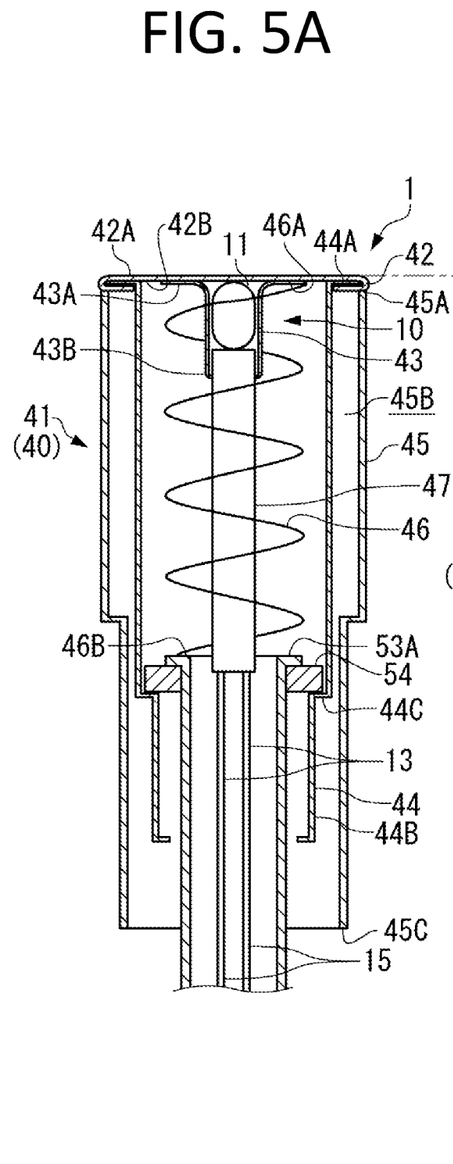
FIG. 5A and FIG. 5B each show a motion of a movable body of the temperature sensor according to one or more embodiments, FIG. 5A showing a position (first position) at the time of no load in which no cookware has been placed, FIG. 5B showing a position (second position) at the time when the movable body has been moved because a cookware has been placed.
Figure 5B:
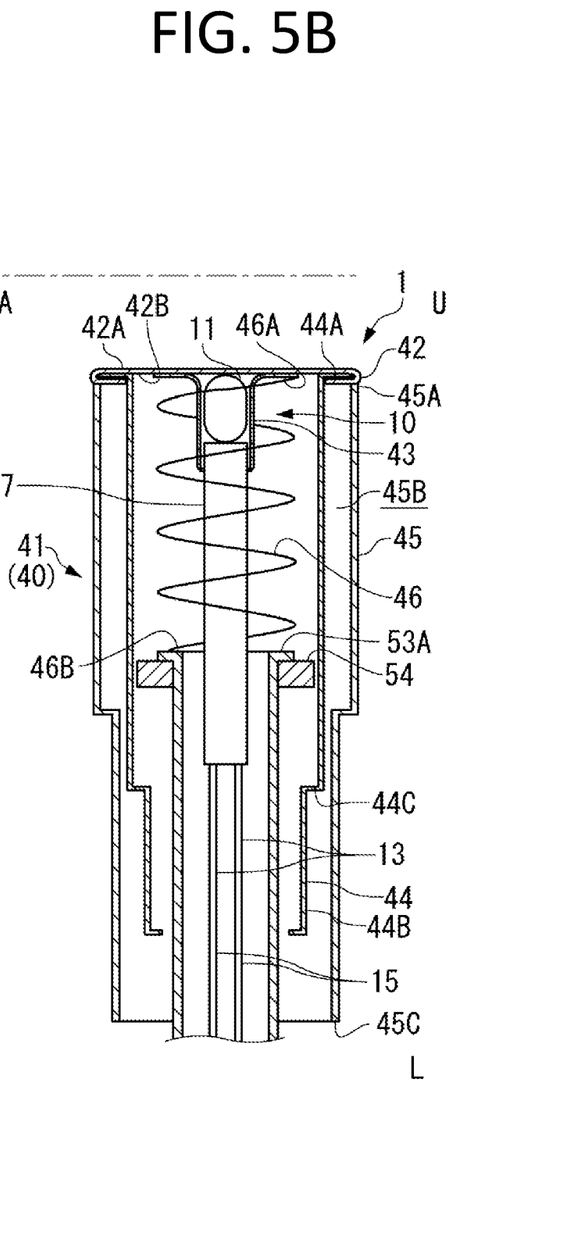

As shown in FIG. 5A, FIG. 5B and FIG. 8, when the cookware 107 is placed on the trivet 106 of the gas stove 100, the heat collecting body 42 abuts on the bottom surface of the cookware 107, and the movable body 41 moves to the downward side L. At this time, as shown in FIG. 5B, the holder 44 and the cover 45 also move against the elastic force of the coil spring 46 together with the heat collecting body 42. Then, since the elastic force from the coil spring 46 is applied to the movable body 41 in the direction of the upward side U, when the cookware 107 is placed on the trivet 106, the movable body 41 stops at the second position shown by the solid line in FIG. 8, while maintaining the state where the contact surface 42A abuts on the cookware 107.

When the cookware 107 is moved away from the trivet 106 after the finish of the cooking, the heat collecting body 42, the holder 44 and the cover 45 move to the upward side U, by the elastic force of the coil spring 46. As shown in FIG. 5A, the heat collecting body 42 and the like stop at the first position at which the step part 44C of the holder 44 comes into contact with the metal washer 54. In this way, in the temperature sensor 1, the movable body 41 holding the heat-sensitive body 11 reciprocates between the first position and the second position.

The movement of the movable body 41 is accompanied by the movement of the connecting wires 30, and therefore, the magnetic shield 61 fixed to the connecting wires 30 also moves with the movement of the movable body 41.

FIG. 6A shows the position of the magnetic shield 61 when the movable body 41 stays at the first position. At this time, the magnetic shield 61 is positioned between the magnetic field generation body 69 and the reed switch 71 (switch part 73). Hereinafter, the position of the magnetic shield 61 at this time is referred to as a shield position.

When the magnetic shield 61 is at the shield position, the shield part 63 of the magnetic shield 61 is positioned between the magnetic field generation body 69 and the switch part 73 of the reed switch 71, and therefore, the magnetic field generated from the magnetic field generation body 69 is absorbed by the shield part 63. Therefore, the switch part 73 does not receive the magnetic field from the magnetic field generation body 69. As a result, in the reed switch 71, the magnetic circuit is opened (OFF).

FIG. 6B shows the position of the magnetic shield 61 when the movable body 41 stays at the second position. The position of the magnetic shield 61 at this time is referred to as a non-shield position.

At this time, the shield part 63 of the magnetic shield 61 is away from between the magnetic field generation body 69 and the switch part 73 of the reed switch 71, and therefore, the magnetic field generated from the magnetic field generation body 69 is not absorbed by the shield part 63. Accordingly, the switch part 73 receives the magnetic field generated from the magnetic field generation body 69. That is, in the reed switch 71, the magnetic circuit is closed (ON), so that it is possible to detect that the cookware 107 has been placed on the trivets 106, 106.

[Composition Materials of Protective Pipe 51 and Shield Part 63]

In one or more embodiments, as an example, the protective pipe 51 is composed of JIS SUS304, and the shield part 63 is composed of JIS SUS420J2.

JIS SUS304 is a non-magnetic austenitic stainless steel, and JIS SUS420J2 is a martensitic stainless steel having ferromagnetic property. The reason why the protective pipe 51 is composed of a non-magnetic austenitic stainless steel is because the magnetic field generated from the magnetic field generation body 69 can pass. The reason why the shield part 63 is composed of a ferromagnetic martensitic stainless steel is because at the shield position, the magnetic field from the magnetic field generation body 69 is shielded and does not reach the reed switch 71.

Next, as for JIS SUS304 composing the protective pipe 51, the hardness when a solution heat treatment (1010-1050° C., rapid cooling) as a standard heat treatment is performed is 200 Hv or less. On the other hand, as for JIS SUS420J2 composing the shield part 63, the hardness when a quenching (920-980° C., oil cooling) and an annealing (800-900° C., slow cooling) as standard heat treatments are performed is 247 Hv or less. That is, by selecting the condition of the heat treatment, the shield part 63 becomes harder than the protective pipe 51. The difference in hardness between the shield part 63 and the protective pipe 51 is 30 Hv or more, and preferably, 50 Hv or more.

[Function Effect of Temperature Sensor 1]

Next, the function effect of the temperature sensor 1 according to one or more embodiments will be described.

<Reduction in Friction Force Between Protective Pipe 51 and Shield Part 63>

In one or more embodiments, there is a difference in hardness between the protective pipe 51 and the shield part 63, and the protective pipe 51 is lower in hardness than the shield part 63. Accordingly, when the shield part 63 slides in the protective pipe 51, the protective pipe 51 having a lower hardness preferentially abrades, and thereby it is possible to reduce the friction force.

If the protective pipe 51 and the shield part 63 are the same in hardness, asperities of the sliding surfaces of the two engage, and therefore the friction force increases. However, when one of the sliding surfaces is higher in hardness than the other as in the case of one or more embodiments, a motion in which the sliding surface having a higher hardness scrapes the sliding surface having a lower hardness is repeated, and thereby it is possible to reduce the friction force.

Stainless steels such as JIS SUS304 and JIS SUS420J2 used for the protective pipe 51 and the shield part 63 in one or more embodiments easily cause seizing under a slide environment, for the following reasons. However, in the use purpose in one or more embodiments, it can be said that the frequency of the slide of the protective pipe 51 and the shield part 63 is small, and therefore the risk of the seizing is very small.

The friction coefficient is high, and it is easy for heat to be generated.

The thermal conductivity is low, and it is hard for heat to escape.

<Structure of Magnetic Shield 61>

Next, the outer diameter of the shield part 63 of the magnetic shield 61 is smaller than the inner diameter of the protective pipe 51 by a slight amount. Thereby, the movement amount in the radial direction (R) of the shield part 63 in the interior of the protective pipe 51 is small. Accordingly, the movement amount in the radial direction (R) of the connecting wires 30 disposed on the inside of the shield part 63 is also small, and therefore, it is possible to reduce the load that is applied to the connecting wires 30.

Next, the holder 65 comprises a ferromagnetic body, and therefore, shields the magnetic field generated by the magnetic field generation body 69, to no small extent. Accordingly, for securing the detection accuracy of the detection unit 60, the holder 65 may deviate from between the magnetic field generation body 69 and the reed switch at both the first position and the second position. Hence, in one or more embodiments, the holder 65 is provided rearward of the shield part 63, such that at the second position, the holder 65 is farther from between the magnetic field generation body 69 and the reed switch 71, than at the first position.

The embodiments of the present invention has been described above. The present invention is not limited to the above embodiments, and various modifications may be made.

<Relation of Hardness>

In the temperature sensor 1 according to the above embodiments, the example in which the shield part 63 is harder than the protective pipe 51 has been described, but the present invention is not limited to this. That is, in contrast to the above embodiments, even when the protective pipe 51 is harder than the shield part 63, it is possible to obtain the effect of the reduction in the friction force between the protective pipe 51 and the shield part 63 described above. However, when the configuration of the detection unit 60 in the above embodiments is assumed, it is assumed that the protective pipe 51 has non-magnetic property and the shield part 63 has ferromagnetic property. In this case, for example, the shield part 63 may be adjusted by heat treatment to have a low hardness, using JIS SUS430, which is a ferritic stainless steel.

<Materials Composing Protective Pipe 51 and Shield Part 63>

In the temperature sensor 1 according to the above embodiments, the protective pipe 51 and shield part 63 composed of stainless steels have been exemplified, but the present invention is not limited to this.

For example, the protective pipe 51, which is assumed to have non-magnetic property in the above embodiments, can be composed of a resin or rubber. Further, the shield part 63 is not limited to a metal material having ferromagnetic property. For example, it is possible to apply a member that can function as a magnetic shield, as exemplified by a resin member in which metal powders having ferromagnetic property are dispersed, a resin member in which a metal film having ferromagnetic property is formed on a surface, and a resin member in which metal films and resins are alternately laminated.

<Configuration of Detection Unit 60>

In the temperature sensor 1 according to the above embodiments, the reed switch 71 is used as means for detecting the magnetic field generated from the magnetic field generation body 69. However, the present invention is not limited to this, and other magnetic detection means such as a coil, a Hall element and a magneto resistive element can be used.

When the magnetic field that passes through the coil changes, the voltage due to electromagnetic induction is generated, and by detecting this voltage, the coil detects magnetism.

When electric current flows through a semiconductor thin film or the like, the voltage depending on the density and orientation of the magnetic field is generated by the Hall effect, and by detecting this voltage, the Hall element detects magnetism.

The magneto resistive element is composed of a material whose electrical resistance changes when a magnetic field is applied, and detects the magnetic field by detecting the change in the electrical resistance.

In addition, a magnetic impedance element, a superconducting quantum interference element and the like can be used. Further, without being limited to magnetism, the detection unit 60 may be configured by another detection technique, for example, by a technique of detecting light.

Figure 7A:
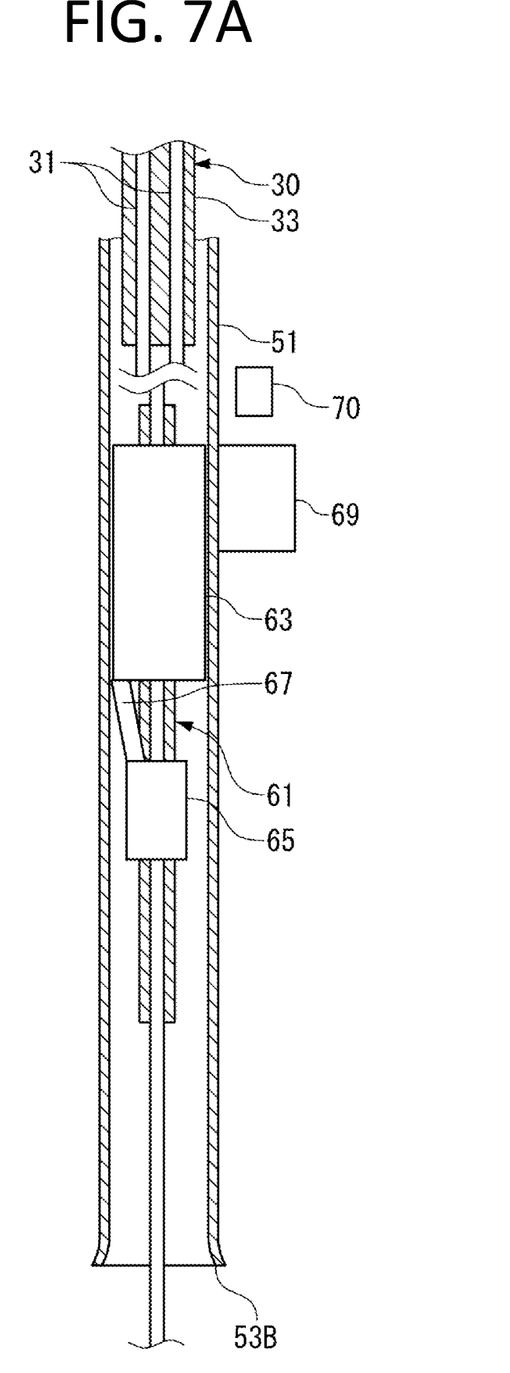
FIG. 7A and FIG. 7B each show a magnetic detection unit according to a modification of one or more embodiments, FIG. 7A showing a state (shield position) where no cookware has been placed and where the magnetic field from the permanent magnet is shielded, FIG. 7B showing a state (non-shield position) where the cookware has been placed and where the magnetic field from the permanent magnet is not shielded and reaches the reed switch.
Figure 7B:
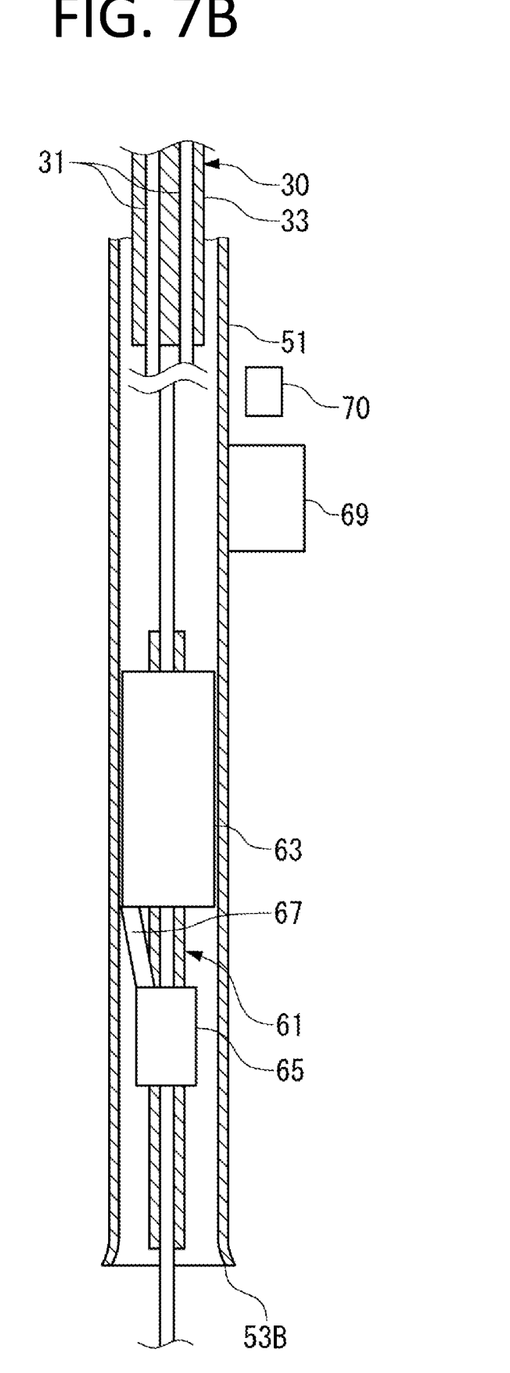

Further, the temperature sensor 1 according to the above embodiments uses the detection unit 60 in which the magnetic circuit is closed (ON) when the cookware 107 is placed on the trivet 106, but the present invention is not limited to this. For example, as shown in FIG. 7A and FIG. 7B, a magnetic sensor 70 comprising a Hall element, a magneto resistive element or the like is provided to be adjacent to the magnetic field generation body 69. When the cookware 107 is not placed on the trivet 106, the magnetic shield 61 is at the position (shield position) where the magnetic shield 61 receives the magnetic field of the magnetic field generation body 69, as shown in FIG. 7A, and when the cookware 107 is placed on the trivet 106, the magnetic shield 61 is at the position (non-shield position) where the movement magnetic shield 61 does not receive the magnetic field of the magnetic field generation body 69, as shown in FIG. 7B.

When the magnetic shield 61 is at the shield position, the magnetic shield 61 absorbs the magnetic field of the magnetic field generation body 69, so that the magnetic field is not applied to the magnetic sensor 70. When the magnetic shield 61 is at the non-shield position, the magnetic shield 61 does not absorb the magnetic field of the magnetic field generation body 69, and thereby, the magnetic field expands to the magnetic sensor 70, so that the magnetic field is applied to the magnetic sensor 70. Thereby, it is possible to detect whether the cookware 107 has been placed on the trivet 106.

<Use Purpose of Temperature Sensor 1>

Furthermore, the gas stove 100 shown as the use purpose of the temperature sensor 1 is just an example of the present invention, and the application can be widely performed to devices each of which contacts with a heating object and measures the temperature. For example, there are an electromagnetic cooker, an electrical rice cooker, a pot, a coffee maker, and the like.

Figure 9:
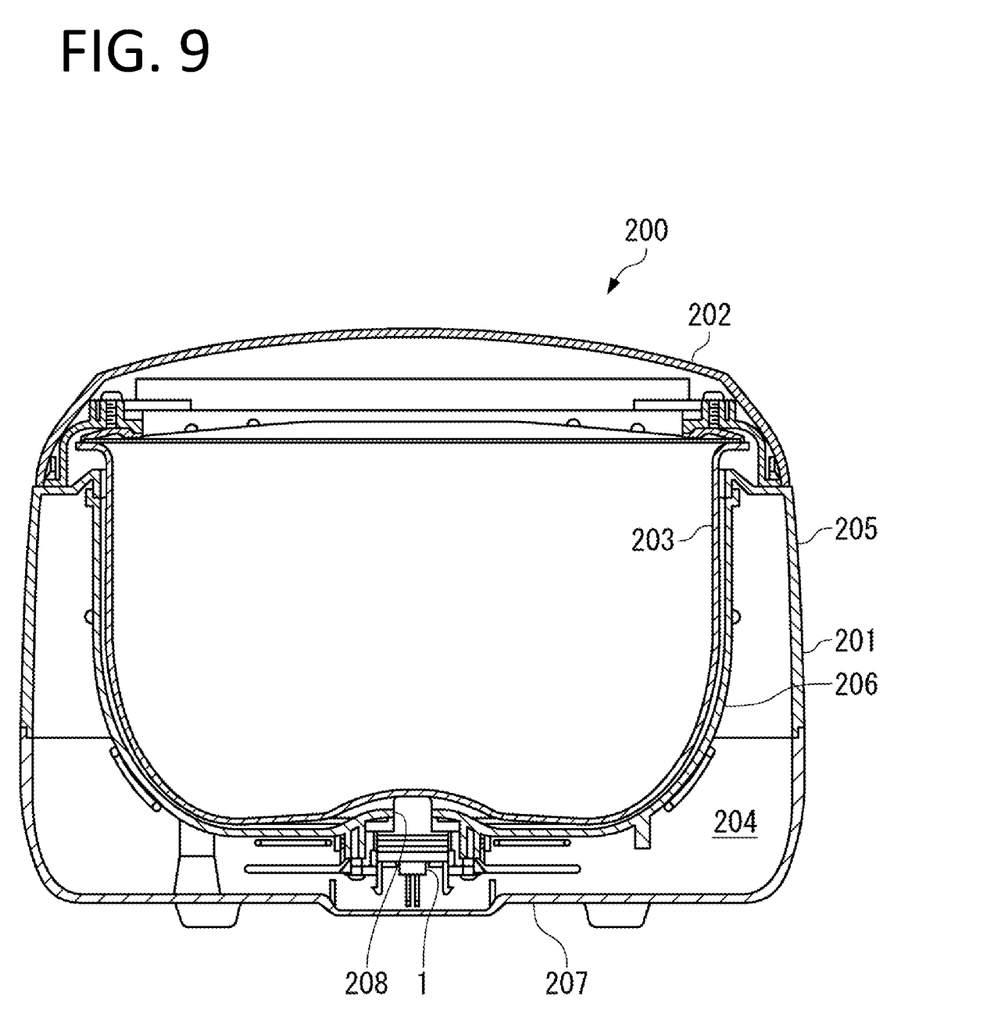
FIG. 9 is a longitudinal sectional view showing a principal part of a rice cooker including the temperature sensor according to one or more embodiments.

FIG. 9 shows an example of the application to an electrical rice cooker 200. The electrical rice cooker 200 includes a double-structure housing 201 configured to be capable of housing a rice cooker 203 for rice cooking in the interior and having a space part 204, and a lid body 202 to cover an upper opening of the housing 201 in an openable and closable manner.

The housing 201 comprises an outer case 205 that is an integrally-molded product made of a synthetic resin, a bottomed pipe-like protective frame 206 made of a synthetic resin, and a saucer-like bottom case 207 made of a synthetic resin and configuring a bottom wall.

At a central part of a bottom surface of the protective frame 206, a temperature sensor 1 for measuring the temperature of the rice cooker is held by a sensor holding hole 208.

Further, the structure of the temperature sensor 1 also is just an example of the present invention, and the application is widely performed to temperature sensors each of which includes a movable body that reciprocates relative to a fixed body. As materials of members constituting the fixed body and the movable body, material other than the materials shown in the above embodiments can be also used. For example, for members in which metal materials are used, molded products composed of resins can be also used if the measurement temperature is low.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST 1 temperature sensor (sensor)
10 heat-sensitive element (temperature sensor)
11 heat-sensitive body
30 connecting wire
40 sensor holding body (sensor holder)
41 movable body
42 heat collecting body
51 protective pipe
60 detection unit (detector)
61 magnetic shield 63 shield part (shield cover)
65 holder (wire holder)
67 connection piece (connector)
69 magnetic field generation body
70 magnetic sensor
71 reed switch
73 switch part
75A, 75B lead wire
76 magnet holder
77 switch protective pipe
100 gas stove (cooking device, object device)
106 trivet
107 cookware (temperature measurement object)
108 bottom surface
200 electrical rice cooker
201 housing
202 lid body
203 rice cooker
204 space part
205 outer case
206 protective frame
207 bottom case
208 sensor holding hole

The invention claimed is:

1. A sensor that detects presence and temperature of a measurement object, the sensor comprising:
    a temperature sensor that comprises a heat-sensitive body and a pair of electrical wires connected with the heat-sensitive body, and detects the temperature of the measurement object;
    a sensor holder that holds the temperature sensor in a movable manner; and
    a detector that detects the presence of the measurement object in response to a movement of the temperature sensor, wherein
    the detector comprises:
        a shield that is attached to the pair of electrical wires and moves in response to the movement of the temperature sensor,
    the sensor holder comprises:
        a pipe that holds the shield and controls a movement of the shield such that the shield moves in a predetermined direction in response to the movement of the temperature sensor,
    the shield comprises:
        a shield cover that surrounds the pair of electrical wires while leaving play between the shield cover and the pair of electrical wires;
        a wire holder that holds the pair of electrical wires; and
        a connector that connects the shield cover and the wire holder.

2. The sensor according to claim 1, wherein
the shield and the pipe are different in hardness,
the pipe is a protective pipe that comprises a non-magnetic body and houses the electrical wires, a position of the protective pipe being fixed to an object device,
the sensor holder further comprises:
    a movable body that supports the heat-sensitive body and is movable relative to the protective pipe,
the shield is a magnetic shield that is movable inside the protective pipe, and
the detector further comprises:
    a magnetic sensor that is disposed at a fixed position outside the protective pipe and detects a change in a magnetic field due to a movement of the magnetic shield that is linked with a movement of the movable body; and
    a magnetic field generation body that is disposed at a fixed position outside the protective pipe and generates the magnetic field.

3. The sensor according to claim 2, wherein
the magnetic shield moves between a shield position and a non-shield position,
at the shield position, the magnetic shield shields the magnetic sensor from the magnetic field generated by the magnetic field generation body, and
at the non-shield position, the magnetic shield does not shield the magnetic sensor from the magnetic field.

4. The sensor according to claim 3, wherein
the wire holder is:
    swaged to the pair of electrical wires to be formed in a cylindrical shape,
    disposed on an opposite side of the heat-sensitive body with respect to the shield cover, and
    connected to the shield cover via the connector that is inclined with respect to an axis line of the shield cover.

5. The sensor according to claim 4, wherein
the wire holder moves between a first position and a second position,
the first position is a forward end of a movable range of the wire holder, the forward end being on a side on which the heat-sensitive body is disposed,
the second position is a rearward end of the movable range on an opposite side of the first position, and
the second position is farther than the first position from a position between the magnetic field generation body and the magnetic sensor.

6. The sensor according to claim 2, wherein
the magnetic shield is composed of a martensitic stainless steel or a ferritic stainless steel,
the protective pipe is composed of an austenitic stainless steel, and
the magnetic shield is harder than the protective pipe.

7. The sensor according to claim 3, wherein
the magnetic shield is composed of a martensitic stainless steel or a ferritic stainless steel,
the protective pipe is composed of an austenitic stainless steel, and
the magnetic shield is harder than the protective pipe.

8. The sensor according to claim 4, wherein
the magnetic shield is composed of a martensitic stainless steel or a ferritic stainless steel,
the protective pipe is composed of an austenitic stainless steel, and
the magnetic shield is harder than the protective pipe.

9. The sensor according to claim 5, wherein
the magnetic shield is composed of a martensitic stainless steel or a ferritic stainless steel,
the protective pipe is composed of an austenitic stainless steel, and
the magnetic shield is harder than the protective pipe.

10. The sensor according to claim 1, wherein a difference in hardness between the shield and the pipe is 50 Hv or more.

11. The sensor according to claim 2, wherein a difference in hardness between the shield and the pipe is 50 Hv or more.

12. The sensor according to claim 3, wherein a difference in hardness between the shield and the pipe is 50 Hv or more.

13. The sensor according to claim 4, wherein a difference in hardness between the shield and the pipe is 50 Hv or more.

14. The sensor according to claim 5, wherein a difference in hardness between the shield and the pipe is 50 Hv or more.

15. The sensor according to claim 6, wherein a difference in hardness between the shield and the pipe is 50 Hv or more.

16. A cooking device comprising the sensor according to claim 1.

* * * * *